United States Patent
Barbarin et al.

(10) Patent No.: US 11,090,982 B2
(45) Date of Patent: Aug. 17, 2021

(54) TIRE TREAD FOR A HEAVY CIVIL-ENGINEERING VEHICLE

(71) Applicant: COMPAGNIE GENERALE DES ETABLISSEMENTS MICHELIN, Clermont-Ferrand (FR)

(72) Inventors: François Barbarin, Clermont-Ferrand (FR); Guillaume Demaziere, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 457 days.

(21) Appl. No.: 15/781,845

(22) PCT Filed: Dec. 6, 2016

(86) PCT No.: PCT/FR2016/053221
§ 371 (c)(1),
(2) Date: Jun. 6, 2018

(87) PCT Pub. No.: WO2017/098131
PCT Pub. Date: Jun. 15, 2017

(65) Prior Publication Data
US 2018/0370291 A1 Dec. 27, 2018

(30) Foreign Application Priority Data

Dec. 7, 2015 (FR) .................................... 1561921

(51) Int. Cl.
*B60C 11/03* (2006.01)
*B60C 11/12* (2006.01)
*B60C 11/00* (2006.01)

(52) U.S. Cl.
CPC .......... *B60C 11/0306* (2013.01); *B60C 11/12* (2013.01); *B60C 11/1236* (2013.01);
(Continued)

(58) Field of Classification Search
CPC ......... B60C 11/03; B60C 11/13; B60C 11/04; B60C 11/12
See application file for complete search history.

(56) References Cited

U.S. PATENT DOCUMENTS 5,665,184 A * 9/1997 Fukumoto ........... B60C 11/0306
152/209.15
6,527,024 B1 * 3/2003 Ashmore ............ B60C 11/0316
152/209.22
(Continued)

FOREIGN PATENT DOCUMENTS

EP 2 583 839 4/2013
EP 2 639 084 9/2013
(Continued)

*Primary Examiner* — Katelyn W Smith
*Assistant Examiner* — Cedrick S Williams
(74) *Attorney, Agent, or Firm* — Cozen O'Connor

(57) ABSTRACT

Tread of a tire (1) for a heavy-duty vehicle of civil engineering type. The tread (2), having an axial width $W_T$ and having a radial thickness $H_T$ at least equal to 70 mm, comprises at least two circumferential grooves (3) positioned axially on each side of an equatorial plane (XZ). Each circumferential groove (3) has an axial width W and a radial depth H, such that the ratio W/H is at least equal to 0.06, the axial distance C between two consecutive circumferential grooves (3) is at least equal to 12% and at most equal to 21% of the axial width $W_T$ of the tread and each of the axially outermost circumferential grooves (3) is positioned axially, with respect to the equatorial plane XZ, at an axial distance $L_E$ at least equal to 35% of the axial width $W_T$ of the tread.

12 Claims, 3 Drawing Sheets

(52) U.S. Cl.
CPC .......... *B60C 2011/0033* (2013.01); *B60C 2011/0348* (2013.01); *B60C 2011/0353* (2013.01); *B60C 2011/0355* (2013.01); *B60C 2011/0386* (2013.01); *B60C 2200/065* (2013.01)

(56) References Cited

U.S. PATENT DOCUMENTS

| | | | |
|---|---|---|---|
| 2003/0094227 A1* | 5/2003 | Bettiol | B60C 11/042 152/209.18 |
| 2004/0211502 A1* | 10/2004 | Ono | B60C 11/11 152/209.19 |
| 2011/0259494 A1* | 10/2011 | Shibano | B60C 11/0309 152/209.22 |
| 2013/0098519 A1 | 4/2013 | Maehara | |
| 2013/0240103 A1 | 9/2013 | Maehara | |
| 2015/0059943 A1* | 3/2015 | Radulescu | B60C 11/033 152/209.17 |
| 2017/0001478 A1 | 1/2017 | Rolland et al. | |

FOREIGN PATENT DOCUMENTS

| | | | | |
|---|---|---|---|---|
| FR | 2989031 A1 * | 10/2013 | ......... | B60C 11/0323 |
| JP | 2011 000 991 | 1/2011 | | |
| JP | 2014 125109 | 7/2014 | | |
| WO | WO 2013/014253 | 1/2013 | | |
| WO | WO 2015/114129 | 8/2015 | | |

* cited by examiner

TIRE TREAD FOR A HEAVY CIVIL-ENGINEERING VEHICLE

RELATED APPLICATIONS

This is a U.S. National Phase Application under 35 USC 371 of International Application PCT/FR2016/053221 filed on Dec. 6, 2016.

This application claims the priority of French application no. 1561921 filed Dec. 7, 2015, the entire content of which is hereby incorporated by reference.

FIELD OF THE INVENTION

The present invention is related to a tire for a heavy-duty vehicle of civil engineering type, intended to carry heavy loads and to run over uneven ground such as that of mines. This invention relates more particularly to the tread of such a tire.

BACKGROUND OF THE INVENTION

In this document:
- a radial direction means a direction perpendicular to the axis of rotation of the tire, corresponding to the direction of the thickness of the tread.
- an axial or transverse direction means a direction parallel to the axis of rotation of the tire.
- a circumferential or longitudinal direction means a direction tangential to the circumference of the tire, perpendicular both to the axial direction and to a radial direction.
- an equatorial plane is a plane perpendicular to the axis of rotation of the tire and dividing the tread widthwise into two halves of equal widths.

The tread is that part of the tire that comprises at least one elastomeric material and is intended to come into contact with the ground via a tread surface and to be worn away.

In order to ensure satisfactory performance in terms of longitudinal grip, in traction and braking, and transverse grip, it is necessary to form within the tread a more or less complex system of cuts separating elements in relief, referred to as a tread pattern In the present document, a cut generically denotes either a groove or a sipe and corresponds to the space delimited by walls of material that face one another and are at a distance from one another which distance is referred to as the "width of the cut". It is precisely this difference that differentiates a sipe from a groove. In the case of a sipe, this distance is suited to allowing the opposing walls delimiting the said sipe to come into at least partial contact with one another at least in the contact patch in which the tread is in contact with the ground, when the tire is subjected to nominal recommended loading and pressure conditions. In the case of a groove, the walls of this groove cannot come into contact with one another under normal running conditions.

By definition, an element in relief formed in the tread extending in the circumferential direction over the entire circumference of the tire is referred to as a rib. A rib comprises two lateral walls and a contact face, the contact face being part of the tread surface intended to come into contact with the ground during running. A rib is delimited by two circumferential cuts or circumferential grooves, unless the said rib is an axially exterior portion of the tread delimited, in this case, on just one side by a circumferential groove.

The tread thus generally comprises cuts distributed among circumferential (or longitudinal) grooves, transverse (or axial) grooves, and transverse (or axial) sipes. What is meant by a circumferential groove is a groove the mean profile of which forms, with the circumferential direction, an angle at most equal to 45°: this is a groove the mean profile of which has an a circumferential overall direction, which means to say of which the mean inclination is closer to the circumferential than axial direction. What is meant by a transverse groove or sipe is a cut the mean profile of which forms, with the circumferential direction, an angle at least equal to 45°: this is a cut the mean profile of which has an axial overall direction, which means to say of which the mean inclination is closer to the axial than circumferential direction. Thus a transverse cut may be strictly transverse, which means to say that its mean profile forms, with the circumferential direction, an angle equal to 90°, or substantially oblique, which means to say that its mean profile forms, with the circumferential direction, an angle strictly smaller than 90°.

The tread is generally geometrically characterized by an axial width $W_T$ and a radial thickness $H_T$. The axial width $W_T$ is defined as being the axial width of the contact surface of the tread of the new tire with smooth ground, the tire being subjected to pressure and load conditions as recommended, for example, by the E.T.R.T.O. (European Tire and Rim Technical Organization) standard. The radial thickness $H_T$ is defined, by convention, as being the maximum radial depth measured in the cuts, usually in the circumferential grooves. In the case of a tire for a heavy-duty vehicle of civil engineering type, and by way of example, the axial width $W_T$ is at least equal to 600 mm and the radial thickness $H_T$ is at least equal to 70 mm.

Usually, the tread comprises at least two circumferential grooves positioned axially one on each side of the equatorial plane. Each circumferential groove extends axially between two substantially circumferential faces, radially toward the inside from the tread surface as far as a bottom face and circumferentially around the entire circumference of the tire. Each circumferential groove positioned axially, with respect to the equatorial plane, at an axial distance L, has a radial depth H, the mean value over the entire periphery of the tire, measured between the tread surface and the bottom face, the radial depth H being at least equal to 70% of the radial thickness $H_T$ and at most equal to the radial thickness $H_T$. Each circumferential groove also has an axial width W, the mean value over the radial depth H of the distance measured between the two substantially circumferential faces of the circumferential groove.

The usual running conditions, in terms of pressure, load and speed, for a tire for a heavy-duty vehicle of the civil engineering type such as, for a dumper intended to transport materials extracted from quarries or opencast mines, are particularly harsh and usually generate high temperatures in the crown of the tire. The crown of the tire comprises, radially from the outside towards the inside, a tread and a crown reinforcement. The crown reinforcement itself usually comprises, radially from the outside towards the inside, at least one protective reinforcement comprising at least one protective layer and a working reinforcement comprising at least two working layers. These high temperatures, generated in the crown, may lead to degradation of the components of the crown and limit the endurance thereof and, therefore, the life of the tire. Reducing the heat level in the crown of the tire is a constant concern of the tire designer.

SUMMARY OF THE INVENTION

One object of the present invention is to provide a tread for a tire of a heavy-duty vehicle of civil engineering type that makes it possible to reduce the temperatures generated in the crown of the tire, and therefore to improve the endurance of the crown of the tire.

This object has been achieved in accordance with one aspect of the present invention directed to a tire for a heavy-duty vehicle of civil engineering type comprising a tread, intended to come into contact with the ground via a tread surface:

the tread having an axial width $W_T$ and a radial thickness $H_T$ at least equal to 70 mm, the tread comprising at least two circumferential grooves, positioned axially one on each side of an equatorial plane passing through the middle of the tread and perpendicular to the axis of rotation of the tire, each circumferential groove extending axially between two substantially circumferential faces, radially towards the inside from the tread surface as far as a bottom face and circumferentially around the entire circumference of the tire, each circumferential groove being axially positioned with respect to the equatorial plane at an axial distance L, having an axial width W, measured between the two substantially circumferential faces, and a radial depth H, measured between the tread surface and the bottom face, each circumferential groove having an axial width W and a radial depth H, such that the ratio W/H is at least equal to 0.06, the axial distance C between two consecutive circumferential grooves being at least equal to 12% and at most equal to 21% of the axial width $W_T$ of the tread, and each of the axially outermost circumferential grooves being positioned axially, with respect to the equatorial plane, at an axial distance $L_E$ at least equal to 35% of the axial width $W_T$ of the tread.

According to one embodiment of the invention, each circumferential groove has an axial width W and a radial depth H, such that the ratio W/H is at least equal to 0.06. The axial width W is the mean value of the distances between the substantially circumferential faces of the circumferential groove, calculated over the radial depth H of the circumferential groove. The radial depth H is the mean value of the distances between the bottom face of the circumferential groove and the tread surface, calculated over the entire circumference of the tire. This feature describes the fact that each circumferential groove must be wide enough to have a significant action on the cooling of the crown portion in vertical alignment with the circumferential groove. The volume of material above the hotspot is thus minimized and the volume of the groove ensures effective ventilation and better exchanges of heat between the crown of the tire and the external air.

According to another embodiment, the axial distance C between two consecutive circumferential grooves is at least equal to 12% and at most equal to 21% of the axial width $W_T$ of the tread. The axial distance C between two consecutive circumferential grooves, also referred to as the axial spacing of the circumferential grooves, is measured between the respective mean surfaces of the circumferential grooves. This feature means that there needs to be a sufficient number of circumferential grooves to ensure cooling of the crown, but that, in order not to penalize the volume of wearable material, this number needs not to be too high.

According to another embodiment, each of the axially outermost circumferential grooves is positioned axially, with respect to the equatorial plane, at an axial distance $L_E$ at least equal to 35% of the axial width $W_T$ of the tread. This implies that the axially outermost circumferential grooves are axially positioned substantially in alignment with the ends of the working layers. This is because these zones are particularly sensitive hotspots from which cracks liable to lead to mechanical failure of the crown may originate.

In summary, embodiments of the invention have a sufficient number of circumferential grooves which are sufficiently wide and axially positioned in vertical alignment with the hotspots of the crown that they can reduce the temperatures at these hotspots.

Advantageously, the ratio W/H is at most equal to 0.15. This maximum value for the ratio W/H guarantees a sufficient volume of wearable material. In addition, it still allows the circumferential groove to close as it enters the contact patch, thereby guaranteeing a tread that is compact and rigid enough to absorb the transverse loadings applied to the tire.

It is also advantageous for the axial distance $L_E$ to be at most equal to 40% of the axial width $W_T$ of the tread. This maximum distance guarantees that there will be a lateral tread portion that is wide enough and therefore sufficiently resistant to chunking.

The axial distance C between two consecutive circumferential grooves is advantageously at least equal to 150% and at most equal to 200% of the radial thickness $H_T$. This feature describes the fact that the number of circumferential grooves is also dependent on the depth of the said circumferential grooves. Thus, the number of grooves needs to be high enough to ensure cooling but, in order to have sufficient rigidity of the elements in relief delimited by two consecutive circumferential grooves, needs not to be too high.

According to a first alternative form of circumferential mean profile, at least one circumferential groove has a rectilinear circumferential mean profile. This is the simplest geometry of circumferential mean profile.

According to a second alternative form of circumferential mean profile, at least one circumferential groove has a periodic wavy circumferential mean profile. Such a wavy circumferential mean profile is characterized by its amplitude A and its period T. The presence of waves limits the retention of stones in the circumferential grooves.

According to a first alternative form of meridian profile, each substantially circumferential face of a circumferential groove forms, with the radial direction, an angle at least equal to 0.5° and at most equal to 5°. What is meant by a meridian profile is a profile in section on a plane normal to the circumferential mean profile, often close to a meridian plane. The angles formed by each substantially circumferential face are also usually referred to as undercut angles. These undercut angles limit the retention of stones by the circumferential groove, by allowing the stones to be ejected.

According to a second alternative form of meridian profile, each substantially circumferential face of a circumferential groove is connected to the bottom face of the circumferential groove by a circular fillet of fillet radius R at least equal to 0.25 times the axial width W. This range of radius values for the fillet connecting the substantially circumferential faces at the bottom of the circumferential groove minimizes the risk of cracks beginning in this zone which is sensitive to cracking.

The tread advantageously comprises at least four circumferential grooves, preferably at least five circumferential grooves. This minimum number of circumferential grooves provides a satisfactory compromise between effective cooling and sufficient volume of wearable material.

The tread more advantageously still comprises at most eight circumferential grooves. Upwards of eight circumferential grooves, the tread contains too many cuts, and is therefore mechanically weaker and inadequate in terms of the volume of wearable material.

According to a first preferred embodiment, the tread comprising a middle portion having an axial width $W_C$ at least equal to 50% and at most equal to 80% of the axial width $W_T$, generally, although not necessarily, delimited axially by the two axially outermost circumferential grooves, and two lateral respectively portions positioned axially on each side of the middle portion and each having an axial width $W_S$ at least equal to 10% and at most equal to 25% of the axial width $W_T$, the tread is such that the middle portion comprises transverse sipes opening into the circumferential grooves. These transverse sipes have a radial depth H1 at least equal to 70% of the radial thickness $H_T$ and delimit elements in relief of a height equal to the radial depth H1 of the said sipes and of circumferential length B1 equal to the mean distance between two consecutive transverse sipes. Advantageously, the ratio H1/B1 is at least equal to 0.5 and at most equal to 2.5.

In this first preferred embodiment, the aforementioned circumferential grooves according to the invention are combined with transverse cuts of sipe type positioned in a middle portion of the tread. By convention, this middle portion has an axial width $W_C$ at least equal to 50% and at most equal to 80% of the axial width $W_T$ and is delimited axially by the two axially outermost circumferential grooves. The circumferential ribs of the said middle portion are thus siped over the entire circumference of the tire. Two consecutive sipes delimit an element in relief having a radial height H1, corresponding to the radial depth H1 of the sipes, and a circumferential length B1, corresponding to the circumferential distance or circumferential spacing between two consecutive sipes.

The location of these sipes in the middle portion of the tread is justified by the fact that this middle portion bears almost all of the load applied to the tire when the vehicle on which it is fitted is running unladen. This principle of siping the middle portion thus makes it possible to reduce tire wear, particularly during the phases in which the vehicle is running unladen. Furthermore, the edge corners of these transverse sipes, namely the intersection between the faces of the sipes and the tread surface, contribute to a better longitudinal grip of the tire, both in terms of traction and under braking.

According to a second preferred embodiment, the tread comprising a middle portion having an axial width $W_C$ at least equal to 50% and most equal to 80% of the axial width $W_T$, generally, although not necessarily, delimited axially by the two axially outermost circumferential grooves, and two lateral portions respectively positioned axially on each side of the middle portion and each having an axial width $W_S$ at least equal to 10% and at most equal to 25% of the axial width $W_T$, the tread is such that at least a lateral portion comprises transverse cuts, of transverse sipe or transverse groove type, opening on one side into a circumferential groove and on the other side into an axial end of the tread. These transverse cuts, of transverse sipe or transverse groove type, have a radial depth H2 at least equal to 70% of the radial thickness $H_T$ and delimit elements in relief of a height equal to the radial depth H2 of the said transverse cuts and of circumferential length B2 equal to the mean distance between two consecutive transverse cuts. Advantageously, for all the elements in relief delimited by two of the consecutive transverse cuts of at least one lateral portion, the ratio H2/B2 is at least equal to 0.5 and at most equal to 2.5.

In this second preferred embodiment, the principle whereby the transverse cuts have a spacing comprised within a given range is extended to at least one lateral portion, usually to both the lateral portions of the tread, which are positioned axially one on each side of the middle portion. Each lateral portion has an axial width $W_S$ at least equal to 10% and at most equal to 25% of the axial width $W_T$, this axial width $W_S$ not necessarily being the same for each of the lateral portions. Indeed, the lateral portions contribute, with the middle portion, to the bearing of the load when the vehicle is running laden. By virtue of the transverse cuts of transverse sipe type, this alternative form therefore makes it possible to reduce the wearing of the lateral parts of the tread during phases in which the vehicle is running laden. Furthermore, the edge corners of these transverse sipes, namely the intersection between the faces of the sipes and the tread surface, contribute to a better longitudinal grip of the tire, both in terms of traction and under braking. By virtue of the transverse cuts of transverse groove type, this alternative form makes it possible to reduce the temperature of the lateral parts of the tread, and therefore improve the thermal endurance of the crown, during phases in which the vehicle is running laden.

According to an alternative form of the second preferred embodiment, at least one lateral portion comprises an alternation of transverse sipes and of transverse grooves such that any element in relief is delimited by a transverse sipe and a transverse groove which are consecutive. For preference, each lateral portion comprises an alternation of transverse sipes and of transverse grooves.

BRIEF DESCRIPTION OF THE DRAWINGS

The features of the invention are illustrated by the schematic FIGS. 1A, 1B, 2A, 2B, 2C and 3A-3C, which are not drawn to scale.

DETAILED DESCRIPTION OF THE DRAWINGS

Figure 1A:
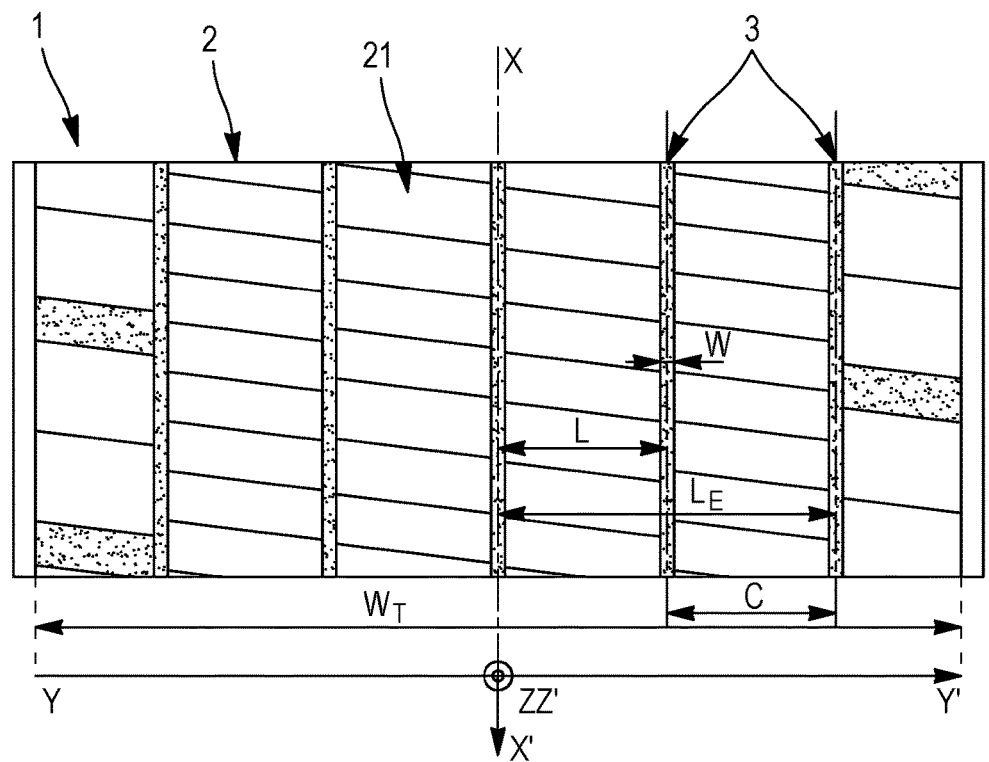
FIG. 1A: a plan view of a tread of a tire according to an embodiment of the invention.

FIG. 1A is a plan view of a tread 2 of a tire 1 according to the invention. The tread 2, intended to come into contact with the ground via a tread surface 21, has an axial width $W_T$ and a radial thickness $H_T$ (not depicted) at least equal to 70 mm. The tread 2, in the case depicted, comprises 5 circumferential grooves 3 positioned axially on or on each side of an equatorial plane XZ passing through the middle of the tread and perpendicular to the axis of rotation YY' of the tire. Each circumferential groove 3 is positioned axially, with respect to the equatorial plane XZ, at an axial distance L, and has an axial width W along the axis YY', and a radial depth H (not depicted) along the axis ZZ', the radial depth H being at least equal to 70% of the radial thickness $H_T$ and at most equal to the radial thickness $H_T$. According to the invention, each circumferential groove 3 has an axial width W and a radial depth H, such that the ratio W/H is at least equal to 0.06, the axial distance C between two consecutive circumferential grooves 3 is at least equal to 12% and at most equal to 21% of the axial width $W_T$ of the tread, and each of the axially outermost circumferential grooves 3 is positioned axially, with respect to the equatorial plane XZ, at an axial distance $L_E$ at least equal to 35% of the axial width $W_T$ of the tread.

Figure 1B:
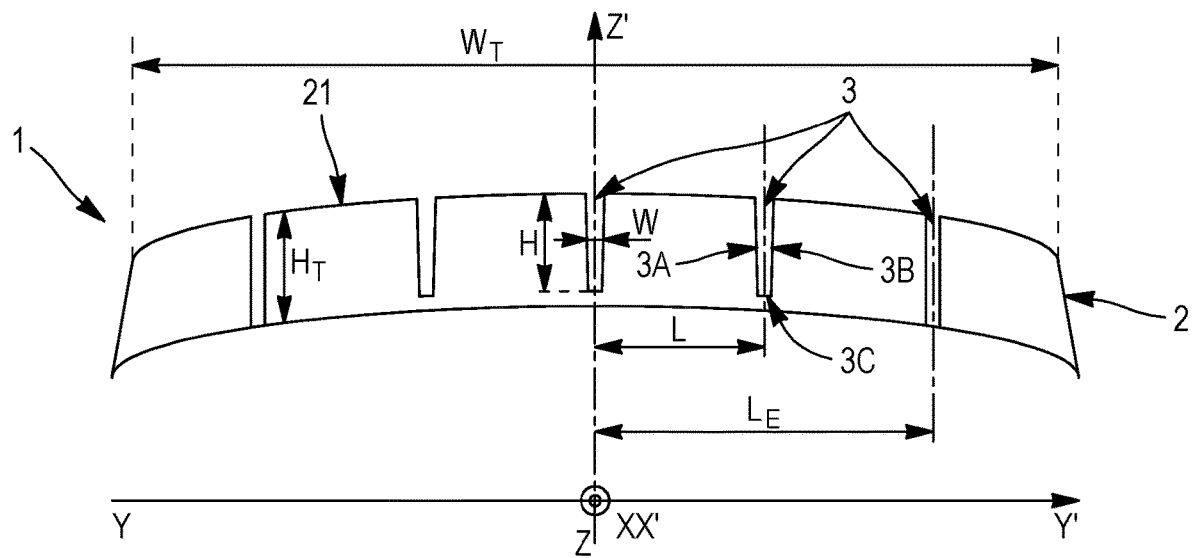
FIG. 1B: a view in meridian section, on a meridian plane YZ, of a tread of a tire according to an embodiment of the invention.

FIG. 1B is a view in meridian section, in a meridian plane YZ of a tread 2 of a tire 1 according to the invention. This FIG. 1B in particular depicts the circumferential grooves 3 in meridian section, namely 5 circumferential grooves in the case presented. In general, a circumferential groove 3 extends axially between two substantially circumferential faces (3A, 3B), radially toward the inside from the tread surface 21 as far as a bottom face 3C and circumferentially around the entire circumference of the tire. A circumferential groove 3, positioned axially with respect to the equatorial plane at an axial distance L, has an axial width W, measured between the two substantially circumferential faces (3A, 3B) and a radial depth H, measured between the tread surface 21 and the bottom face 3C. The radial depth H of a circumferential groove 3 is at least equal to 70% and at most equal to 100% of the radial thickness $H_T$. The radial thickness $H_T$ of the tread 2 is defined as being the maximum radial depth measured in the cuts, namely, in this instance, between the tread surface 21 and the bottom face 3C of the axially outermost circumferential groove 3 which in this instance is the deepest cut. The radial thickness $H_T$ is at least equal to 70 mm.

Figures 2A, 2B:
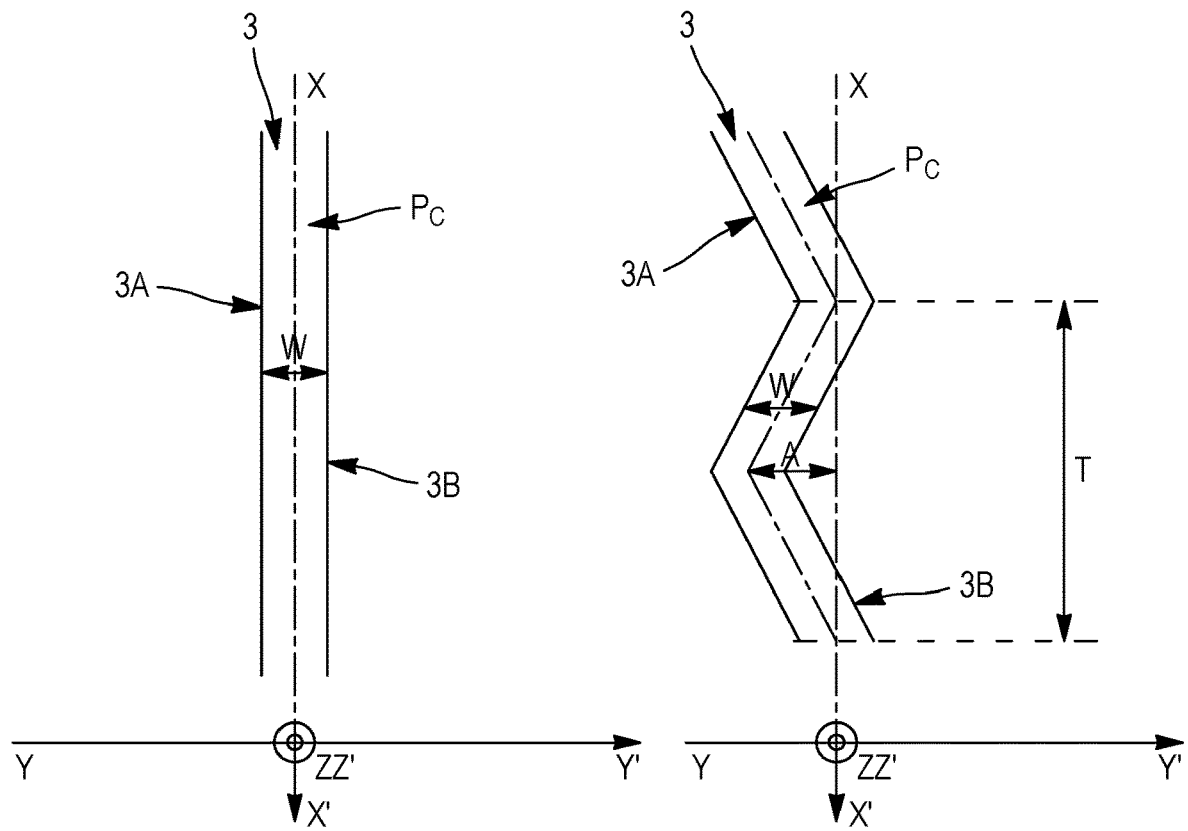
FIG. 2A: a plan view of a circumferential groove of a tread according to a first alternative form of circumferential mean profile.
FIG. 2B: a plan view of a circumferential groove of a tread according to a second alternative form of circumferential mean profile.
Figure 2C:
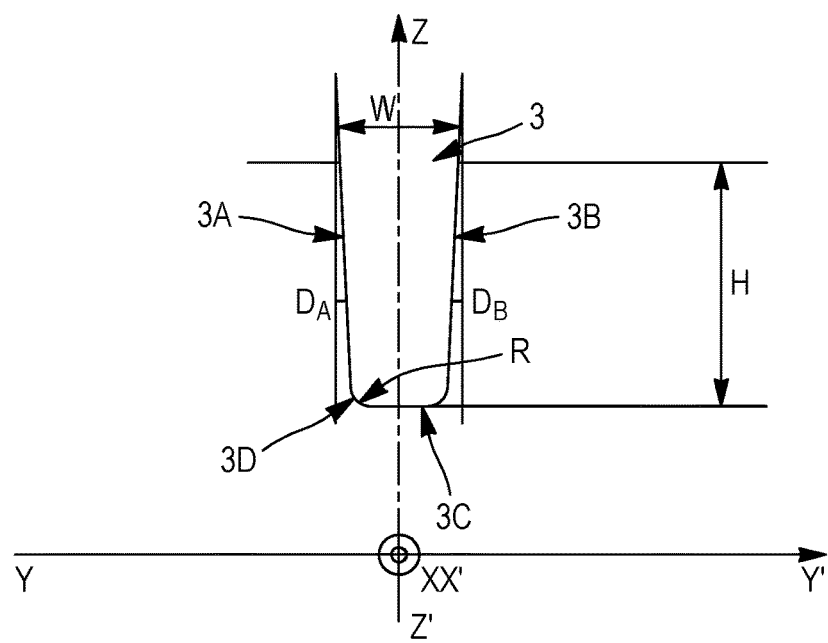
FIG. 2C: a view in meridian section of a circumferential groove of a tread.

FIG. 2A depicts a plan view of a circumferential groove 3, having an axial width W, measured between the two substantially circumferential faces (3A, 3B), and having a rectilinear circumferential mean profile $P_C$, according to a first alternative form of circumferential mean profile. FIG. 2B depicts a plan view of a circumferential groove 3, having an axial width W, measured between the two substantially circumferential faces (3A, 3B), and having a periodic wavy circumferential mean profile ($P_C$) of amplitude A and of period T, according to a second alternative form of circumferential mean profile. FIG. 2C depicts a meridian section, on a plane (often close to a meridian plane) normal to the mean plane of a circumferential groove 3, having an axial width W, measured between the two substantially circumferential faces (3A, 3B), and a radial depth H, measured between the tread surface 21 and the bottom face 3C. Furthermore, each substantially circumferential face (3A, 3B) of the circumferential groove 3 forms, with the radial direction ZZ', an angle (DA, DB) at least equal to 0.5° and at most equal to 5° and is connected to the bottom face 3C by a circular fillet (3D) of fillet radius R at least equal to 0.25 times the axial width W.

Figure 3A:
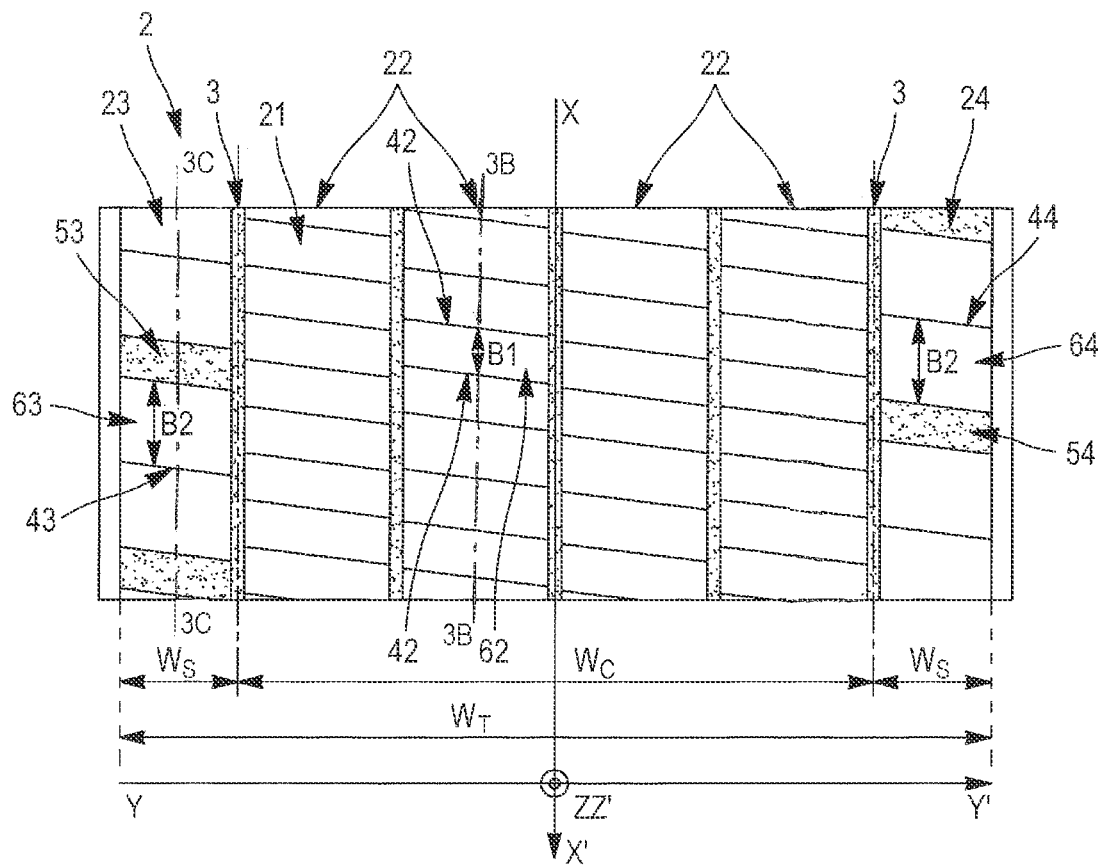
FIG. 3A: a plan view of a tread of a tire according to a preferred embodiment of the transverse cuts.
Figures 3B, 3C:
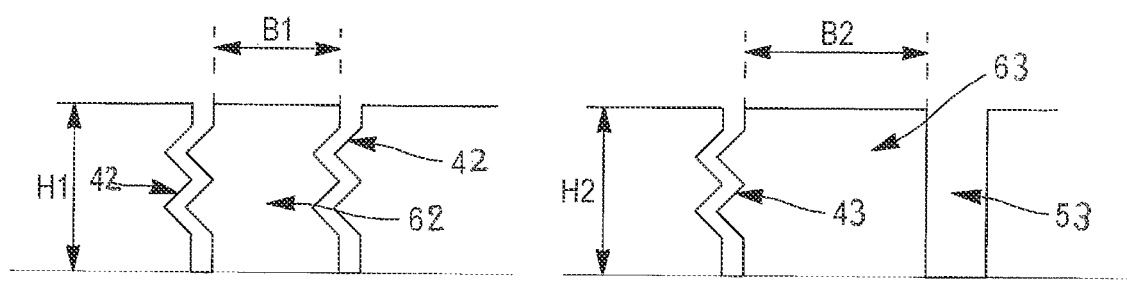
FIG. 3B: a sectional view taken along 3B-3B in FIG. 3A.
FIG. 3C: a sectional view taken along 3C-3C in FIG. 3A.

FIGS. 3A-3C depict a preferred embodiment of the invention, with regard to the transverse cuts, in which embodiment the tread 2 comprises a middle portion 22 having an axial width $W_C$ at least equal to 50% and at most equal to 80% of the axial width $W_T$, delimited axially by the two axially outermost circumferential grooves 3, and two lateral portions (23, 24) axially positioned respectively one on each side of the middle portion 22 and each having an axial width $W_S$ at least equal to 10% and at most equal to 25% of the axial width $W_T$. The tread 2 is such that the middle portion 22 comprises transverse sipes 42 opening into the circumferential grooves 3. These transverse sipes 42 have a radial depth H1 at least equal to 70% of the radial thickness $H_T$ and delimit elements in relief 62 of a height equal to the radial depth H1 of the said transverse sipes and of circumferential length B1 equal to the mean distance between two consecutive transverse sipes 42. For all the elements in relief 62 delimited by two consecutive transverse sipes 42 of the middle portion 22, the ratio H1/B1 is at least equal to 0.5 and at most equal to 2.5.

In the embodiment depicted in FIGS. 3A-3C, the tread 2 is such that each lateral portion (23, 24) comprises transverse cuts, of transverse sipe (43, 44) and transverse groove (53, 54) type, opening on one side into a circumferential groove (3) and on the other side into an axial end of the tread 2. These transverse cuts (43, 44; 53, 54) have a radial depth H2 at least equal to 70% of the radial thickness $H_T$ and delimit elements in relief (63, 64) of a height equal to the radial depth H2 of the said transverse cuts, and of circumferential length B2 equal to the mean distance between two consecutive transverse cuts (43, 44; 53, 54). For all the elements in relief (63, 64) delimited by two consecutive transverse cuts (43, 44; 53, 54) in each lateral portion (23, 24) the ratio H2/B2 is at least equal to 0.5 and at most equal to 2.5. In the alternative form of embodiment depicted, each lateral portion (23, 24) comprises an alternation of transverse sipes (43, 44) and of transverse grooves (53, 54) such that any element in relief (63, 64) is delimited by a transverse sipe (43, 44) and a transverse groove (53, 54) which are consecutive.

The inventors have studied this invention more particularly in the case of a dumper tire of size 40.00R57 and 59/80R63.

The characteristics of the tread for these tires according to the invention are presented in Table 1 below:

TABLE 1

| Tire size | 40.00R57 | 59/80R63 |
| --- | --- | --- |
| Axial width $W_T$ (mm) | 1000 | 1200 |
| Radial thickness $H_T$ (mm) | 108 | 70 |
| Axial width W (mm) | 8 to 10 | 10 |
| Radial depth H (mm) | 102 to 108 | 70 |
| Ratio W/H | 0.076 to 0.098 | 0.14 |
| Axial distance C (mm) | 173 | 200 |
| Ratio $C/W_T$ | 0.173 | 0.17 |
| Axial distance $L_E$ (mm) | 362 | 440 |
| Ratio $L_E/W_T$ | 0.36 | 0.37 |

The improvements made in terms of temperature, in relation to a tire of the prior art of the Michelin XDR2 range, are given in Table 2 below:

TABLE 2

| Tire size | 40.00R57 | 59/80R63 |
| --- | --- | --- |
| Improvement in terms of temperature at the centre of the tread (° C.) | 20° C. | 9° C. |
| Improvement in terms of temperature at the axial ends of the working reinforcement (° C.) | 5° C. | 4° C. |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy-duty vehicle of civil engineering type comprising a tread, adapted to come into contact with the ground via a tread surface:

the tread having an axial width $W_T$ and a radial thickness $H_T$ at least equal to 70 mm, the tread comprising at least two circumferential grooves, positioned axially one on each side of an equatorial plane passing through the middle of the tread and perpendicular to the axis of rotation of the tire, each said circumferential groove extending axially between two substantially circumferential faces, radially towards the inside from the tread surface as far as a bottom face and circumferentially around the entire circumference of the tire, each said circumferential groove being axially positioned with respect to the equatorial plane at an axial distance L, having an axial width W, measured between the two substantially circumferential faces, and a radial depth H, measured between the tread surface and the bottom face, the radial depth H being at least equal to 70% of the radial thickness $H_T$ and at most equal to the radial thickness $H_T$, wherein each said circumferential groove has an axial width W and a radial depth H, such that the ratio W/H is at least equal to 0.06, wherein the axial distance C between two consecutive circumferential grooves is at least equal to 12% and at most equal to 21% of the axial width $W_T$ of the tread, and wherein each of the axially outermost circumferential grooves is positioned axially, with respect to the equatorial plane, at an axial distance $L_E$ at least equal to 35% of the axial width $W_T$ of the tread, and wherein the axial distance C between two consecutive circumferential grooves is at least equal to 150% and at most equal to 200% of the radial thickness $H_T$.

2. The tire for a heavy-duty vehicle of civil engineering type according to claim 1, wherein the ratio W/H is at most equal to 0.15.

3. The tire for a heavy-duty vehicle of civil engineering type according to claim 1, wherein the axial distance $L_E$ is at most equal to 40% of the axial width $W_T$ of the tread.

4. The tire for a heavy-duty vehicle of civil engineering type according to claim 1, wherein at least one said circumferential groove has a rectilinear circumferential mean profile.

5. The tire for a heavy-duty vehicle of civil engineering type according to claim 1, wherein at least one said circumferential groove has a periodic wavy circumferential mean profile.

6. The tire for a heavy-duty vehicle of civil engineering type according to claim 1, wherein each said substantially circumferential face of a circumferential groove forms, with the radial direction, an angle at least equal to 0.5° and at most equal to 5°.

7. The tire for a heavy-duty vehicle of civil engineering type according to claim 1, wherein each said substantially circumferential face of a circumferential groove is connected to the bottom face of the circumferential groove by a circular fillet of fillet radius R at least equal to 0.25 times the axial width W.

8. The tire for a heavy-duty vehicle of civil engineering type according to claim 1, wherein the tread comprises at least four of the circumferential grooves.

9. The tire for a heavy-duty vehicle of civil engineering type according to claim 1, wherein the tread comprises at most eight of the circumferential grooves.

10. The tire for a heavy-duty vehicle of civil engineering type according to claim 1, the tread comprising a middle part having an axial width $W_C$ at least equal to 50% and at most equal to 80% of the axial width $W_T$, and two lateral portions, respectively positioned axially on either side of the middle part, and each having an axial width $W_S$ at least equal to 10% and at most equal to 25% of the axial width $W_T$, the tread being such that the middle portion comprises transverse sipes opening into the circumferential grooves, said transverse sipes having a radial depth H1 at least equal to 70% of the radial thickness $H_T$ and delimiting elements in relief of a height equal to the radial depth H1 of said transverse sipes and of circumferential length B1 equal to the mean distance between two consecutive said transverse sipes, wherein, for all the elements in relief delimited by two consecutive said transverse sipes of the middle portion, the ratio H1/B1 is at least equal to 0.5 and at most equal to 2.5.

11. The tire for a heavy-duty vehicle of civil engineering type according to claim 1, the tread comprising a middle part having an axial width $W_C$ at least equal to 50% and at most equal to 80% of the axial width $W_T$, and two lateral portions, respectively positioned axially on either side of the middle part, and each having an axial width $W_S$ at least equal to 10% and at most equal to 25% of the total axial $W_T$, the tread being such that at least a said lateral portion comprises transverse cuts, of transverse sipe or transverse groove type, opening on one side into a said circumferential groove and on the other side into an axial end of the tread, said transverse cuts having a radial depth H2 at least equal to 70% of the radial thickness $H_T$ and delimiting elements in relief of a height equal to the radial depth H2 of said transverse cuts and of circumferential length B2 equal to the mean distance between two consecutive said transverse cuts, wherein, for all the elements in relief delimited by two consecutive said transverse cuts of at least one said lateral portion, the ratio H2/B2 is at least equal to 0.5 and at most equal to 2.5.

12. The tire for a heavy-duty vehicle of civil engineering type according to claim 11, wherein at least one said lateral portion comprises an alternation of said transverse sipes and of said transverse grooves such that any said element in relief is delimited by a said transverse sipe and a said transverse groove which are consecutive.

* * * * *